United States Patent [19]

Dorff et al.

[11] Patent Number: 5,489,921
[45] Date of Patent: Feb. 6, 1996

[54] METHOD FOR GENERATING UNIFORM COLOR AREA DEFINITIONS WITH ADDITION AND REMOVAL OPERATORS

[75] Inventors: Peter Dorff, Moerfelden-Walldorf; Joern Kowalewski, Preetz; Sigrid A. L. Doehler, Karlsruhe; Uwe-Jens Krabbenhoeft, Landwehr, all of Germany

[73] Assignee: Linotype-Hell AG, Kiel, Germany

[21] Appl. No.: 224,473

[22] Filed: Apr. 7, 1994

[30] Foreign Application Priority Data

Apr. 8, 1993 [DE] Germany ............................ 43 11 611.6
Dec. 6, 1993 [DE] Germany ............................ 43 41 457.5

[51] Int. Cl.⁶ ..................................................... G09G 5/04
[52] U.S. Cl. ......................................................... 345/153
[58] Field of Search ..................................... 345/150, 153, 345/155; 395/131; 358/531, 537, 538

[56] References Cited

U.S. PATENT DOCUMENTS

| | | |
|---|---|---|
| 4,464,677 | 8/1984 | Kuhn et al. . |
| 4,941,039 | 7/1990 | E'Errico . |
| 5,210,602 | 5/1993 | Mintzer . |
| 5,270,806 | 12/1993 | Venable et al. .......................... 345/150 |
| 5,311,212 | 5/1994 | Beretta .................................... 345/150 |
| 5,334,992 | 8/1994 | Rochat et al. ........................... 345/150 |

FOREIGN PATENT DOCUMENTS

| | | | |
|---|---|---|---|
| 2813519C2 | 5/1982 | Germany | ........................... G03F 3/08 |
| 3003607C2 | 1/1984 | Germany | ........................... G01J 3/50 |
| 4012905A1 | 10/1991 | Germany | ........................... G03F 3/08 |
| 2117902 | 10/1983 | United Kingdom | ........... G01N 21/27 |

*Primary Examiner*—Jeffery Brier
*Attorney, Agent, or Firm*—Hill, Steadman & Simpson

[57] ABSTRACT

A method for selective color correction of a color image that is deposited in a store and is displayed on a monitor. Color samples of the colors that are to be corrected are taken from the image with a coordinate input means. The color samples are deposited in a color sample memory and form a cloud in a CIELAB color space. This cloud usually has gaps and singular dots. In order to avoid discontinuities, the cloud is filtered and the gaps and singular dots are thus removed. The arrangement of the color samples in the color space can be displayed in a dialogue window in that color correction values are also input. A color computer uses the color samples and the color correction values for the selective color correction of the image. The image corrected in this way can be stored in the store and can be used for the production of color separations.

20 Claims, 16 Drawing Sheets

```
1  2  1
2  4  2
1  2  1
```

1 2 1
2 4 2
1 2 1

METHOD FOR GENERATING UNIFORM COLOR AREA DEFINITIONS WITH ADDITION AND REMOVAL OPERATORS

RELATED APPLICATIONS

The present application is related to the following two copending applications: Peter Dorff et al application entitled "METHOD FOR GENERATING HARMONIC COLOR CORRECTIONS IN A COLOR SPACE, PARTICULARLY A CIELAB COLOR SPACE", U.S. patent application Ser. No. 08/224,587 filed Apr. 7, 1994 and Uwe-Jens Krabbenhoeft application entitled "METHOD FOR GENERATING GEOMETRIC MASKS WITH A DIGITAL COLOR COMPUTER", U.S. patent application Ser. No. 08/224,050 filed Apr. 7, 1994.

BACKGROUND OF THE INVENTION

The invention is directed to a method and to an arrangement for fine area correction of color images. This method is also known under the names of selective or partial color correction or retouch. A system for selective color correction and color recognition is already disclosed by Published Great Britain Application GB 2117902. Here, an operator can move a cursor back and forth on a color image that is displayed on a monitor. For correcting a specific color of the image, the cursor is brought to a picture element that corresponds to the color to be corrected and the corresponding color coordinates or color values are stored. In order to reduce errors in the color selection, picture elements from the environment of the selected picture element are also taken into consideration. Further, samples can also be taken in the dark and in the bright area of the color in order to also be able to take dark and bright areas of the color into consideration in the color correction. The result may be seen in FIG. 1. Here, the colors are shown in the LAB color space. Analogous to the luminance of the samples that have been taken, a plurality of planes result in the L*-axis in which the individual samples are contained. The centroid of the samples is now identified for each of these planes and the points acquired in this way are connected with a curve I. In order to also allow color deviations from the curve I, color values are also taken into consideration that lie at a defined distance or in a defined tolerance region r from the curve I. The result is a three-dimensional color space that contains the color to be corrected. Colors that lie outside the color space are not corrected. A disadvantage of this method is that the color space is designed rotationally-symmetrically relative to the I curve, so that an arbitrary shaping of a color correction area is not possible, and colors that are actually also to be corrected are thereby not covered. A solution of this problem would be comprised in enlarging the tolerance region r; this, however, leads to the fact that colors at other locations in the color space are then also covered which are not to be corrected.

Another possibility for selective color retouch is comprised in placing a mask (also often referred to as a "lasso") around a color in the image to be corrected, as shown in FIG. 2. An area in the image that contains the selected color is traced with the cursor and a geometric mask is thus generated. The color correction then acts only on the area inside the mask. The problem of this method is that extremely bright or extremely dark regions are also co-covered. This can lead to an over-correction of the dark or bright locations, this being noticed in the color-corrected image as disturbing color spots. Further, the demarcation of the area in the image or the generation of the mask must occur extremely precisely since the entire color area in the image is otherwise not covered, or an adjoining color is also covered which is not supposed to be corrected. This then leads to color discontinuities at the locations in the image where different colors abut one another.

SUMMARY OF THE INVENTION

It is an object of the present invention to resolve the afore-mentioned problems involved with the prior art and to present a simplified method for color selection in selective color retouch, whereby arbitrarily shaped color spaces can be produced that contain all colors to be corrected.

According to the invention, a method is provided for color correction within an original color image. An image store is provided for storing the original color image and/or a corrected color image. A monitor displays the stored color image and/or the corrected color image and/or other image data. A coordinate input means indicates image coordinates on the monitor. A color sample memory is provided for storing color samples. A color computer corrects color values of the stored original color image.

With the invention, color samples are taken from the color image with the coordinate input means. The collected color values of the color samples are stored in the color sample memory. The arrangement of the color samples in a color space having a color coordinate system can be displayed on the monitor. The acquired color samples can be subjected to a filtering and the color sample space produced in this way or the color sample spaces produced in this way in a color space can have an arbitrary shape and can be employed for selective color correction. Color correction values can be input. These color correction values act on the colors defined by the color sample spaces. The color computer uses the color sample spaces that have been produced and the color correction values for the selective color correction of the color image. The color image correction in this way is stored in the image store.

The following figures are attached for a better understanding of the invention and of the embodiments thereof.

DESCRIPTION OF THE PREFERRED EMBODIMENTS

A preferred embodiment of the invention shall be described first in the following. It is assumed in the preferred embodiment of the invention that an image is digitally stored in the CIELAB color space (see DIN 5033). This color space is formed from the luminance axis L*, from the red/green axis a*, and from the yellow/blue axis b*. It is approximately in conformity with sensation, and is constructed in agreement with the color sensation of man. The CIELAB color space makes it possible to exchange color data independently of apparatus and system. The image data are calculated by opto-electrical scanning of the originals with scanners known in reproduction and by subsequent analog-to-digital conversion of the image signals acquired in the scanning.

Figure 1:
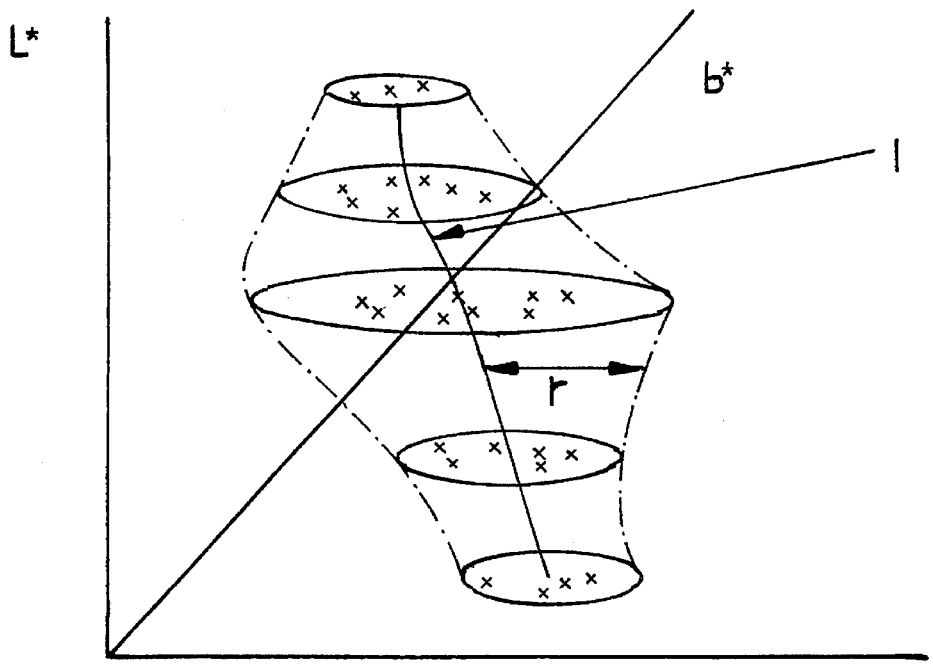
FIG. 1 is a LAB color space with the generated color sub-space (prior art)
Figure 2:
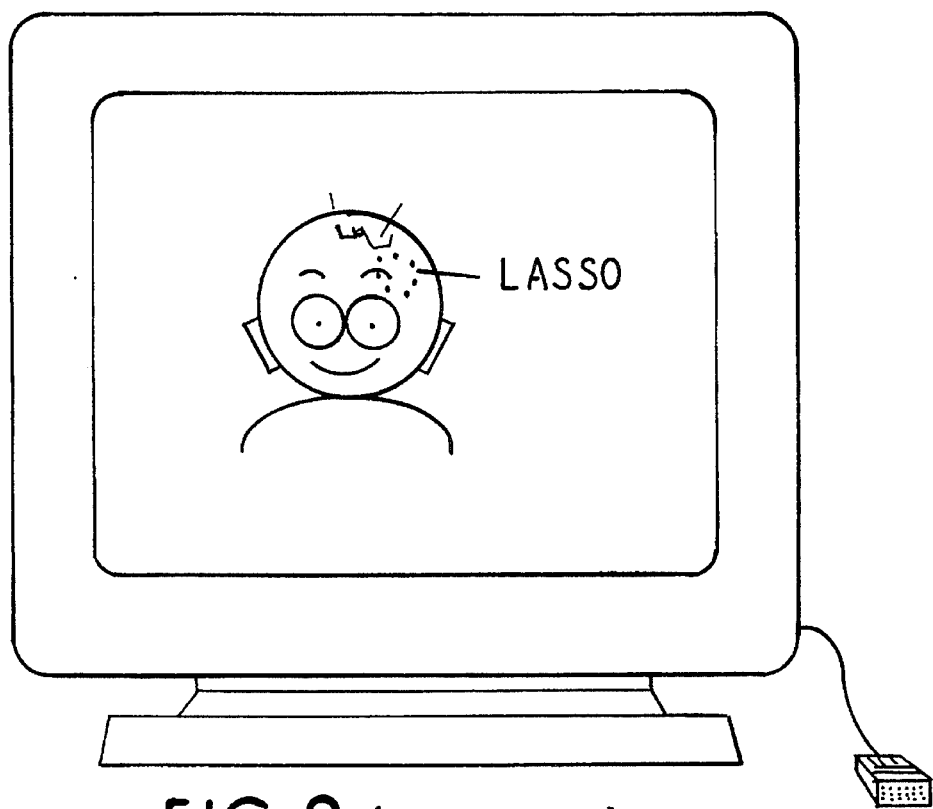
FIG. 2 illustrates the generating of a geometric mask (prior art)
Figure 3:
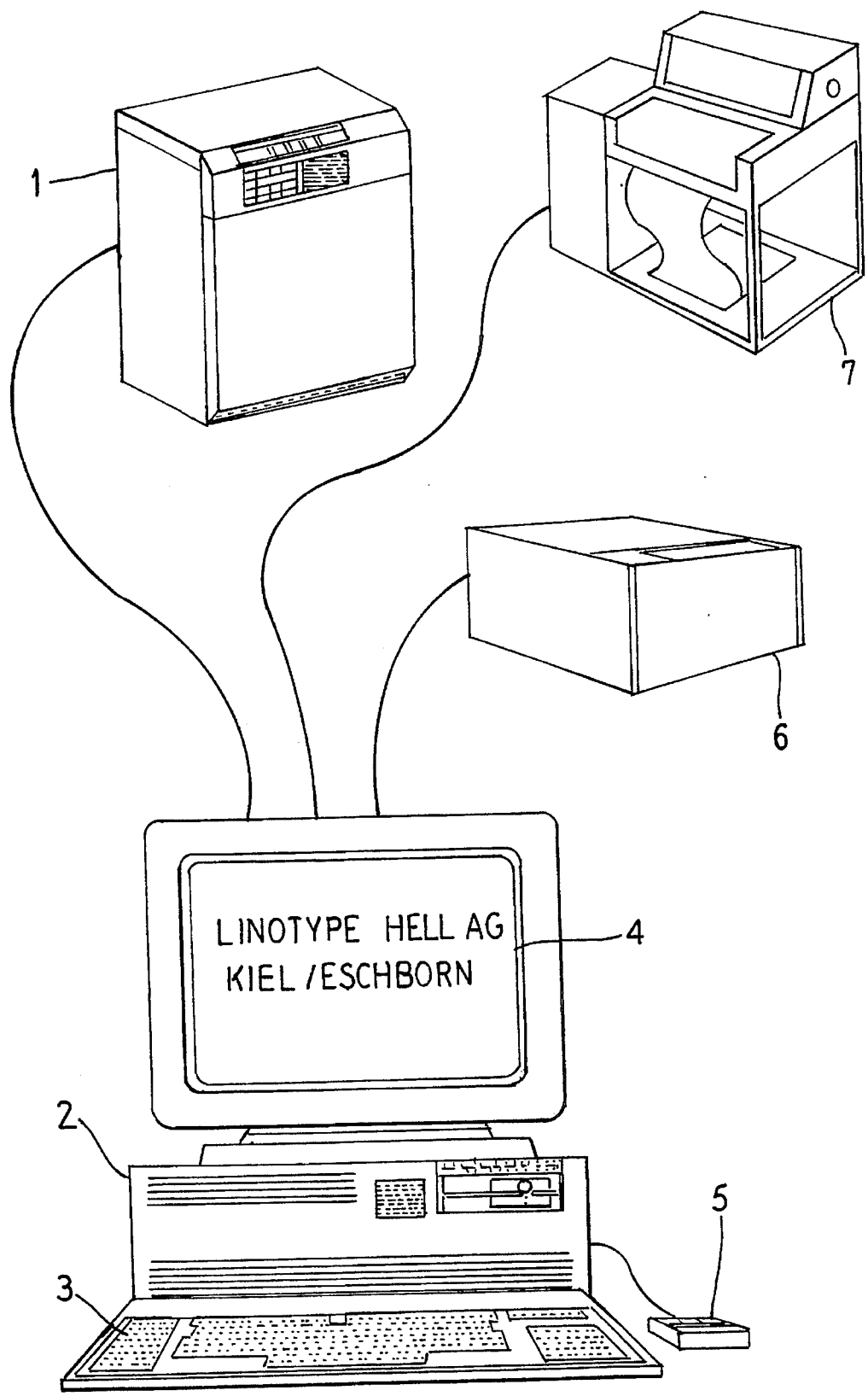
FIG. 3 is a general illustration of the system employed in the invention.

FIG. 3 shows a general illustration of the system employed in the preferred embodiment of the invention. A scanner (for example, a chromagraph S2000 of Linotype-Hell AG, Kiel, Germany) for scanning originals is referenced 1, this supplying image data in digital form to a work station 2 (for example, Apple Macintosh of Apple Inc., California, USA) that is provided with a keyboard 3 for the input of data and with a monitor 4 for the display of data. A mouse 5 is present for the input of picture screen coordinates. This can also be replaced, however, by an xy-tablet, by a track ball, a joy stick or a similar coordinate input means. For faster processing of color image data, a color computer 6 (CTU color transformation unit of Linotype-Hell AG) is connected to the work station 2, this undertaking necessary color calculations. The color computer 6 can also be implemented by an appropriate program or software; the processing of the color data then occurs correspondingly slower. An output means 7 (for example, a Recorder Chromagraph R3020 of Linotype-Hell AG) is present for outputting color separations, completely processed color images being capable of being output onto film therewith.

Figure 4:
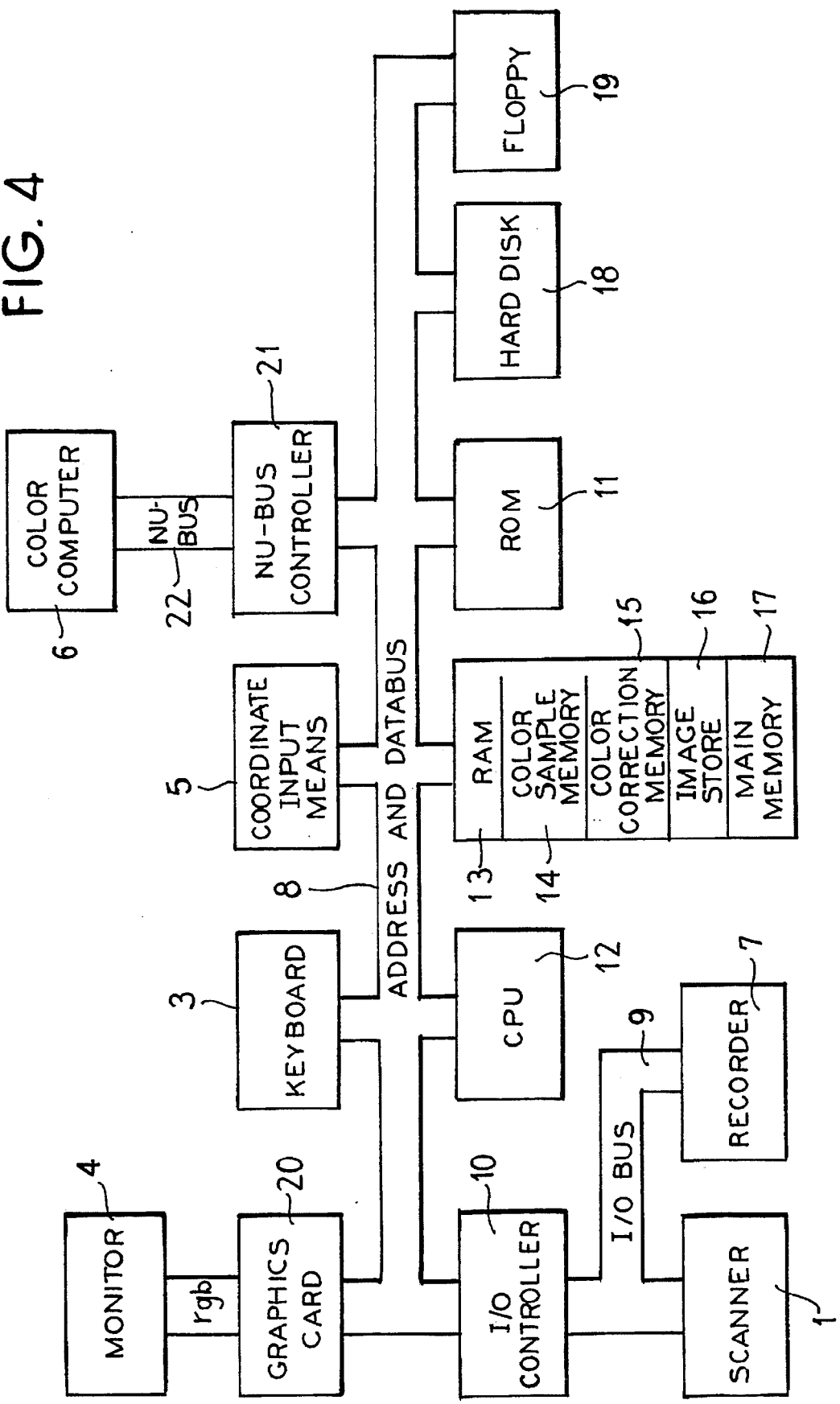
FIG. 4 is a block diagram of the system employed in the invention.

The block diagram in FIG. 4 provides an overview of the signal flow within the system. All components of the work station 2 are connected to one another via an internal bus 8. The data from the originals' scanner 1 proceed via the I/O bus 9 and the I/O controller 10 onto the internal bus 8 and are then deposited in the RAM 13 or on the hard disk 18. The I/O controller 10 controls the data flow of the external input and output devices with the internal system. In addition to the originals' scanner 1 and the recorder 7, other input and output devices can also be connected to the work station 2 such as, for example, a photo CD disk drive that supplies data in YCC format, a flat bed scanner, a laser printer, etc.

The program needed for the operation of the CPU 12 is stored in the ROM 11; for storing various data, for example image data and data that are needed for the operation of the system, the RAM 13 is subdivided into a number of areas. One area of the RAM 13 is employed as a memory for color samples or as color sample memory 14. The color sample memory 14 in the RAM 13 is organized such that the L*a*b* color values can address a location in the color sample memory 14. Color corrections for a color image that was deposited in the image store 16 can be stored in the color correction memory 15. The main memory 17 serves the purpose of intermediately storing results. The overall functions of the system are controlled by the CPU 12. Data files and other data can be stored on a hard disk 18 and on the floppy 19. The monitor 4 serves the purpose of displaying image data and other data and has its own graphics card 20 with a picture screen memory for a faster output of image data. The keyboard 3 serves the purpose of inputting commands to the CPU 12 and of inputting other data. For faster color correction of color image data, a color computer 6 is connected via a NU-bus controller 21 and via a NU-bus 22. The detailed description thereof shall follow later.

Upon startup of the system, a main program is first started and all system components are initialized. Variables are set to a standard value. A user surface for operation and control of the system and of the individual components is constructed on the monitor 4. The user surface contains a plurality of picture screen windows for displaying various information and a plurality of pull-down means for setting an input of other functions and data.

Figure 5:
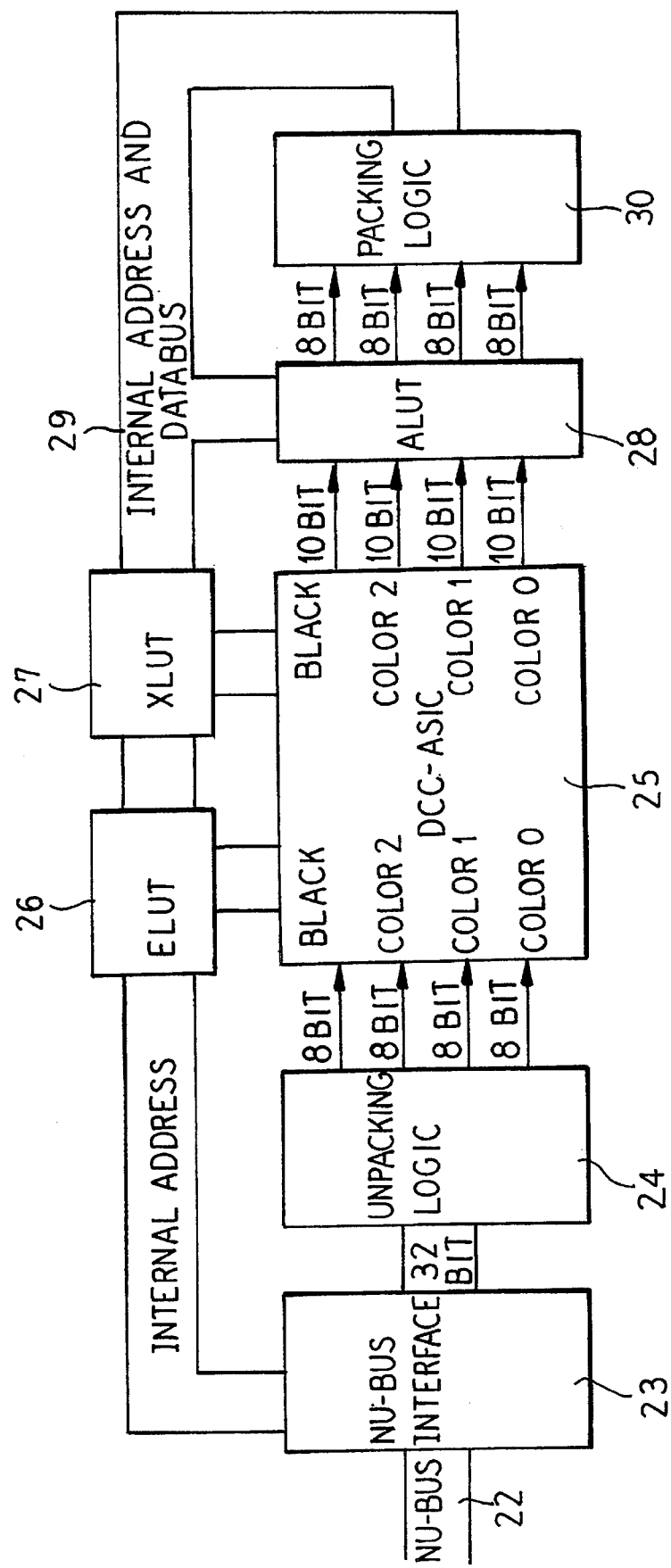
FIG. 5 is a block diagram of a color computer (CTU) employed in the present invention.

The color computer in FIG. 5 communicates via the NU bus 22 with the work station 2. The color image data are first sorted according to a prescribed format by the unpacking logic 24 and are then supplied to a block referenced DCC-Asic 25. The DCC-Asic 25 (digital color conversion) is composed of a specific circuit that undertakes an interpolation of color data and of a NU bus interface 23 for controlling the data flow. An input table ELUT 26 initially converts the 8-bit color data into 10-bit values. The necessary color correction is then undertaken with the XLUT 27. For that purpose, the 5 MSB of the color data address a corresponding location in the XLUT 27. An interpolation of the output values is then undertaken in the DCC-Asic 25 with the 5 LSB of the color data and with the values from the XLUT 27. The DCC-Asic is answerable for the actual calculating operation of the color conversion. The three-dimensional interpolation of a color dot is implemented according to the principle of tetrahedron interpolation (see DE-C-2813519) with the four corner points V0 through V3 of the tetrahedron surrounding the dot. These four corner points are successively read out of the XLUT 27 by the DCC-Asic, are subsequently weighted and added up. This occurs in parallel for all three or four colors to be converted (inputs of black, color 0, color 1, color 2 of the DCC-Asic). The output values calculated in this way can be forwarded in parametered fashion directly onto the outputs (black, color 0, color 1, color 2) of the Asic or can previously be multiplicatively operated with the black value. The addresses for reading the tetrahedron corner points V0 . . . V3 from the XLUT 27 are acquired by the DCC-Asic 25 from the 5 MSB of the color inputs. The output values are supplied to an output table ALUT 28 that undertakes a conversion from the 10-bit format into an 8-bit format. A packing logic 30 sorts the output color data according to a desired format. The color image data are then supplied via the internal address and data bus 29 and via the NU bus 22 to the work station 2 and can be appropriately further-processed and stored. Desired fillings or occupancies are written into the ELUT 26, XLUT 27, ALUT 28 via the internal data and address bus 29.

For a fine-area correction, a color image is first loaded from the input device 1, the hard disk 18 or the floppy 19 into the image store 16. Since work is preferably carried out in the CIELAB data format, the color data are appropriately converted when they are not present in the CIELAB format. For that purpose, the tables of the ELUT 26, XLUT 27, ALUT 28 are provided with a corresponding filling or occupancy. The CPU then reads the original image data, which are not established in the CIELAB format, from the image store 16 and transmits them via the NU bus 22 to the input of the color computer. At the output of the packing logic 30, the converted data can then be taken via the bus 29 and the NU bus interface 23 and can be deposited in the image store 16. Data that are supplied from an input device in a different format first pass through this conversion process, so that they are internally present in the CIELAB format.

On the basis of a plurality of different conversion processes, the system can process arbitrary input formats such as, for example, RGB, YCC. Television signals or video signals in different norms such as, for example, NTSC, PAL, SECAM, HD-Mac, MPEG2 can also be processed. Assuming that the data files generated by scanners or by other user programs are present in the TIFF or in the PICT data file format, they can also be read in and converted into the CIELAB format.

Just as a conversion of various input formats occurs at the input side, a conversion into a desired output format of the image data is possible at the output side, for example CMYK (cyan, magenta, yellow, black) or RGB (red, green, blue). The conversions of the various formats can occur on the basis of a plurality of sub-programs that are stored on the hard disk 18, on the floppy disk 19 or in the ROM 11 and are executed by the CPU 12 after the I/O controller 10 has written new image data into the RAM 13, or data are output from the RAM 13 via the I/O controller 10 to an output device. The CPU 12 then calls in a specific conversion program for the corresponding data conversion which brings the data into the necessary format.

A conversion from the CIELAB to the RGB format and back is also undertaken in order to display the picture on the monitor 4. The image store of the graphics card 20 is loaded with the RGB image data for that purpose. The image can then be displayed on the picture screen in an image window. A plurality of image windows can be present for a fine-area correction in order to display the original and the manipulated color image side-by-side. The monitor should be calibrated for a true color reproduction of the colors.

For a fine-area correction, the color sample memory 14 is erased in that a "0" is written into all memory cells of the color sample memory. For taking color samples with a coordinate input means 5, the CPU 12 first reads the input coordinates on the image window that were recited with the coordinate input means 5, for example a mouse in this case, and then reads the corresponding color values from the image store 16 of the RAM 13. The conversion of cursor coordinates into addresses for memories is disclosed by Patent Application WO 80/02612 (Preuss et al) of Linotype-Hell AG. Via the bus 8, the corresponding location in the color sample memory 14 is then set. For that purpose, the color data L*a*b* of the image pixel sought with the coordinate input means 5 address a corresponding location in the color sample memory 14, this then being set. For that purpose, a "1" can be written into the corresponding memory cell.

After color samples have been taken from an image with the coordinate input means 5, the color sample memory 14 contains a corresponding plurality of color samples. The color samples can be subjected to a filtering with the CPU 12. The exact description of the filtering occurs later in the menu "fine-area correction." A copy of the original color samples can be deposited in the main memory 17.

Figure 6A:
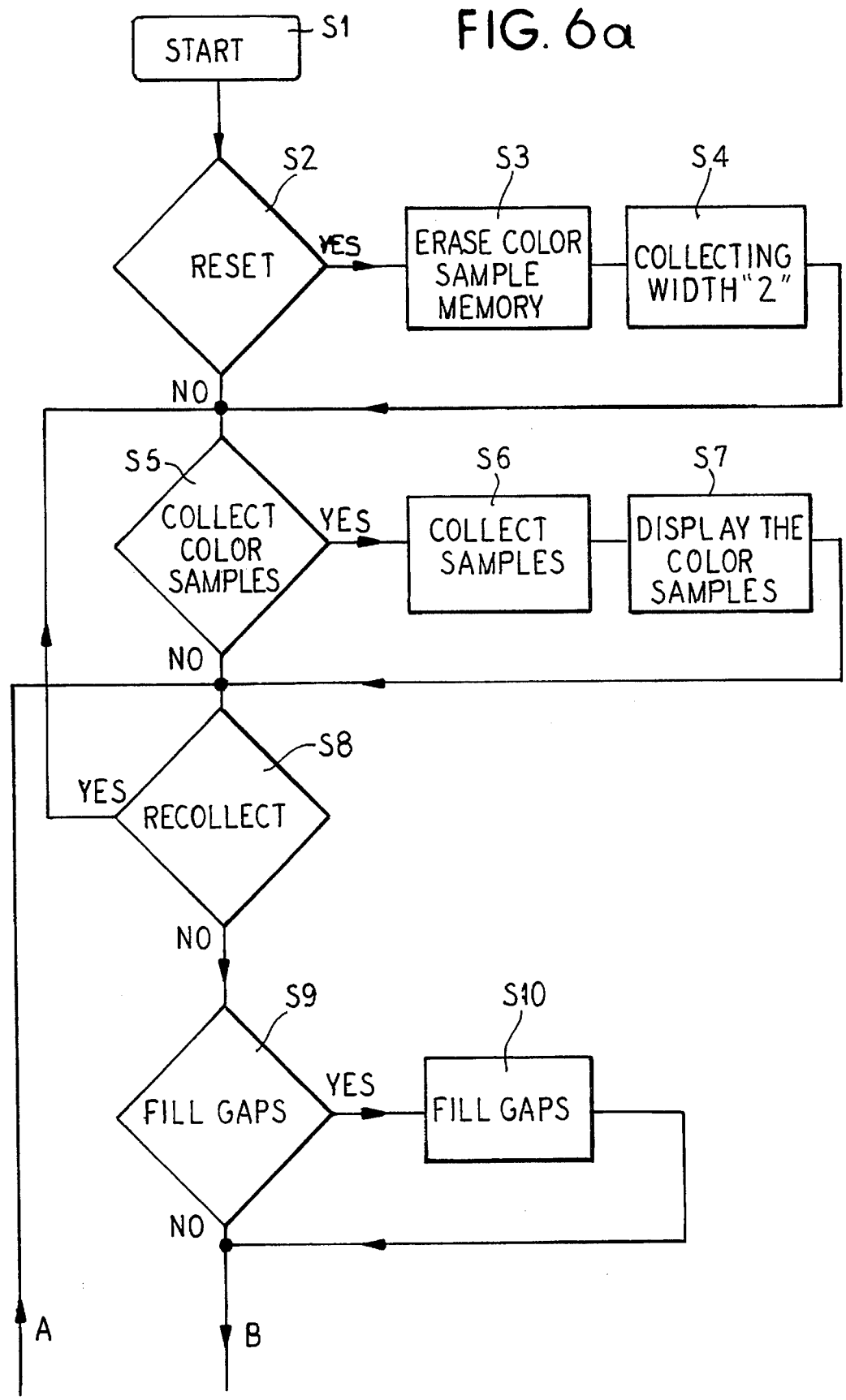
FIGS. 6a, 6b, and 6c are a flow chart of fine area corrections.
Figure 6B:
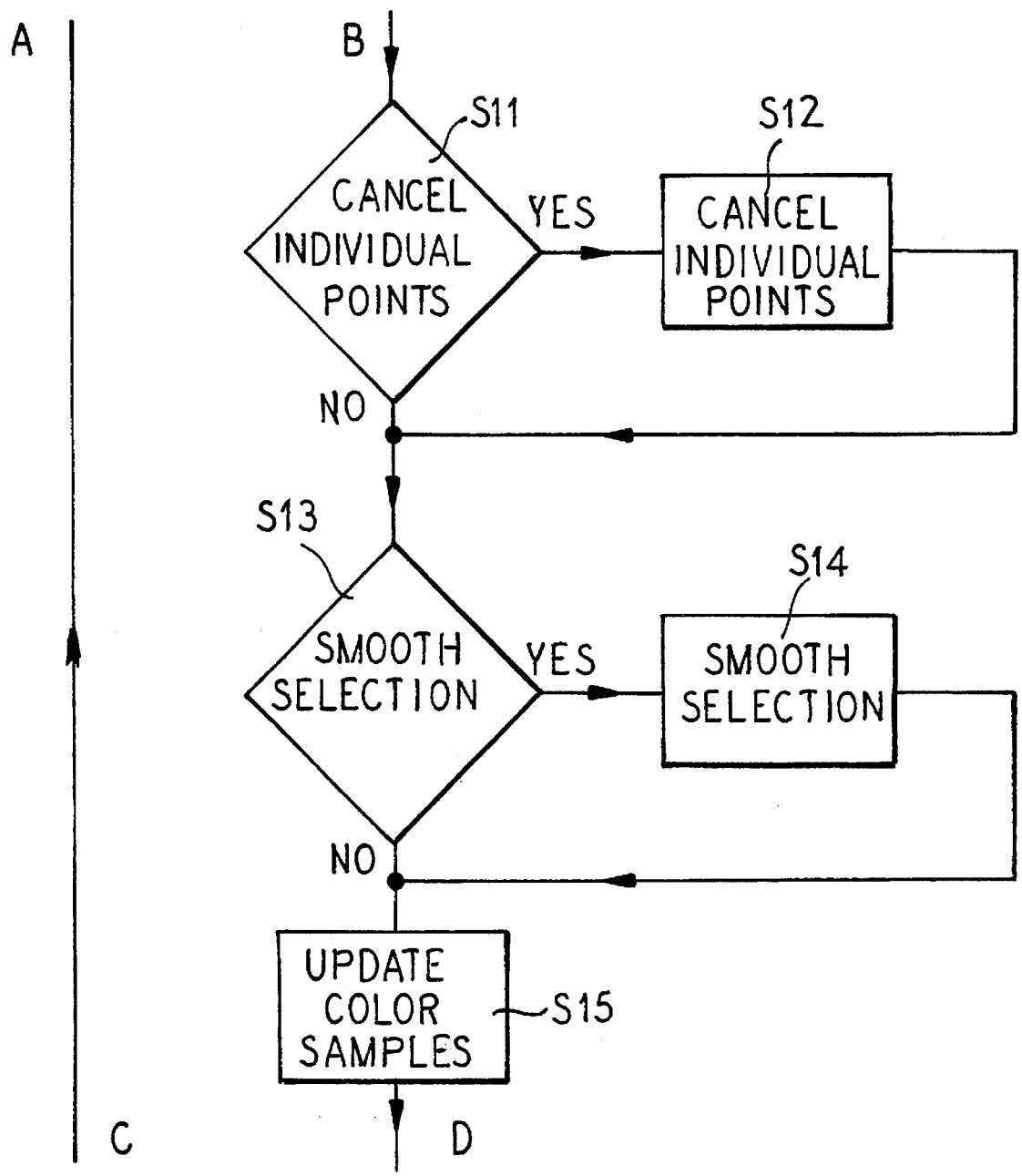
Figure 6C:
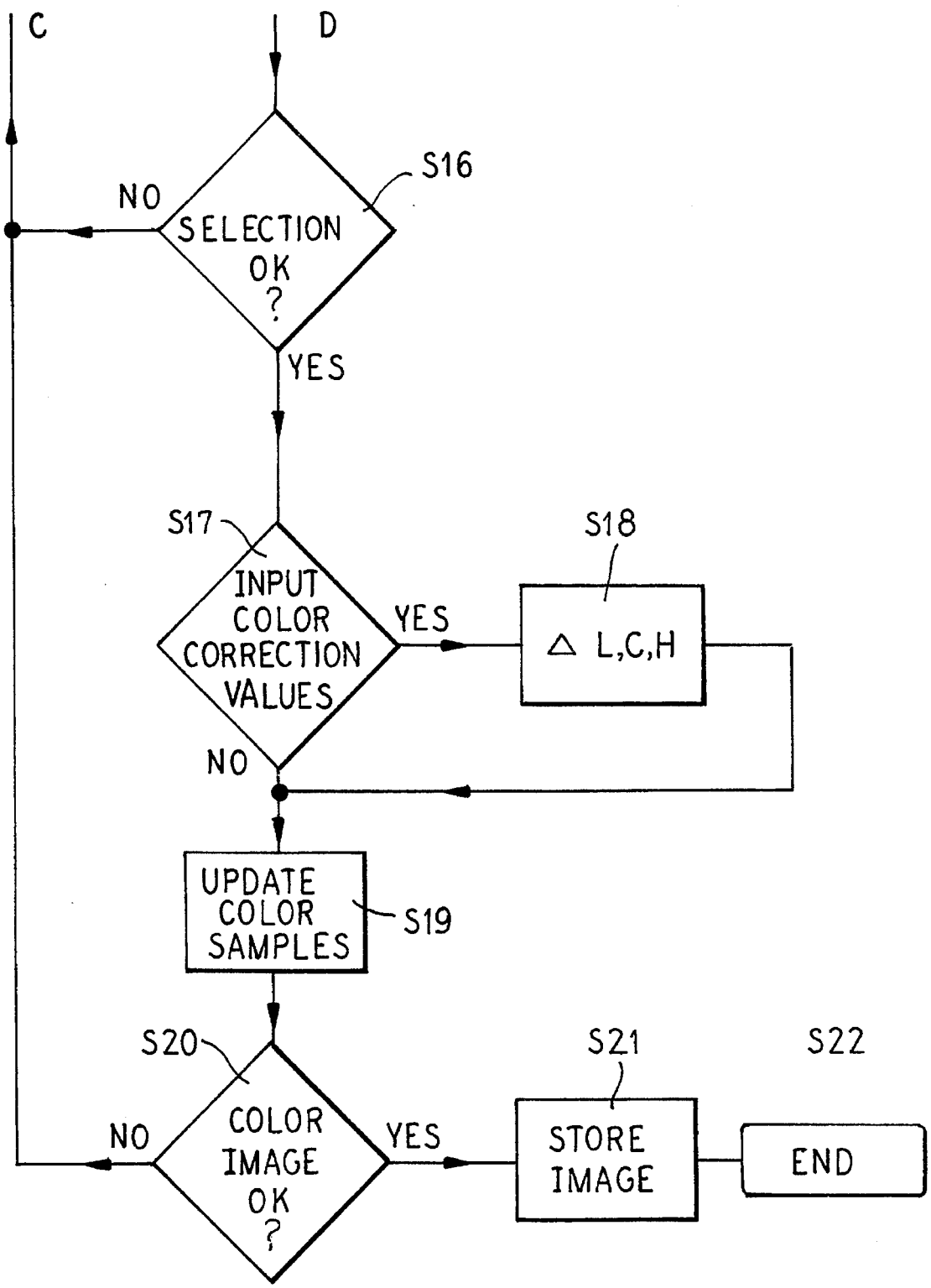
Figure 7:
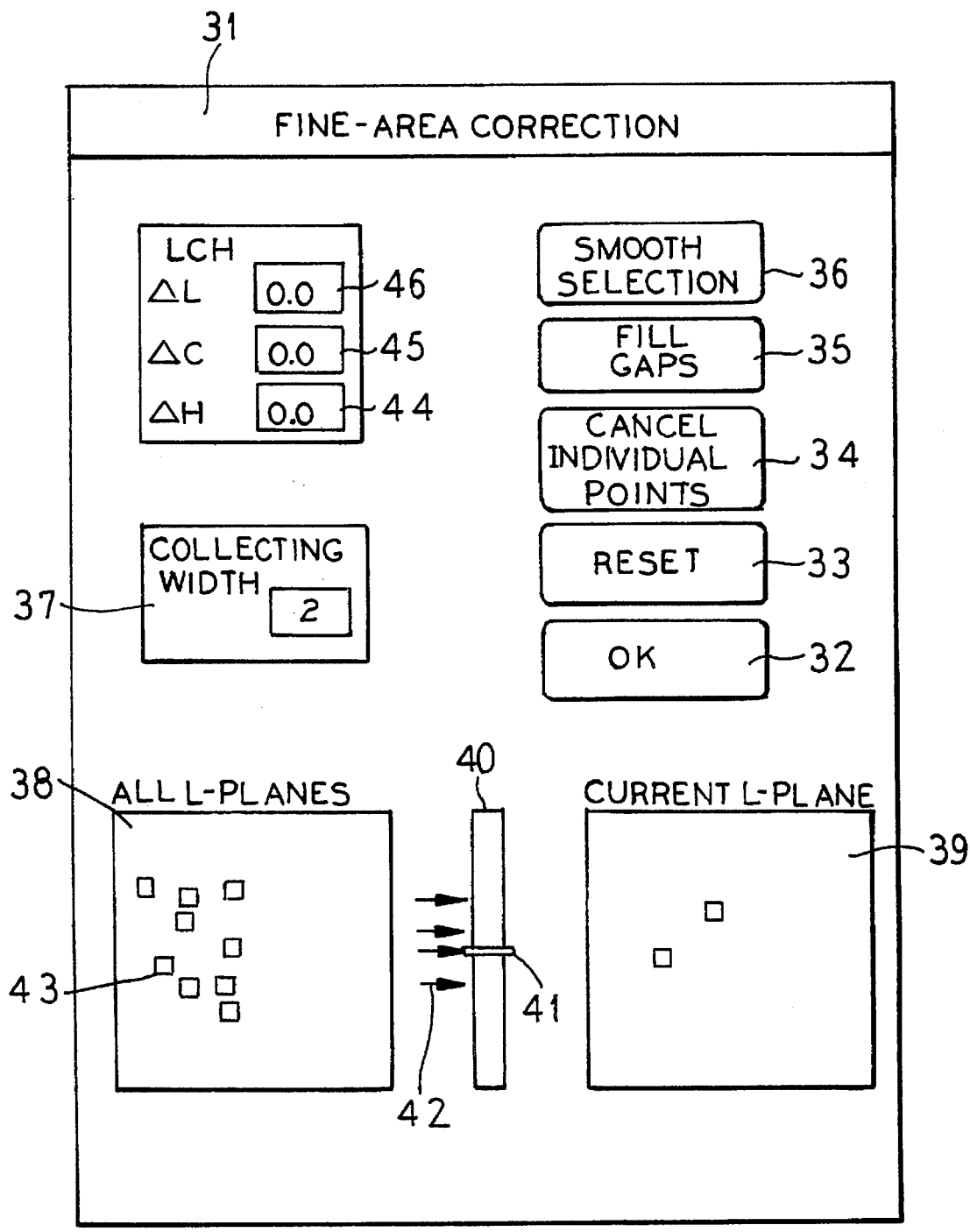
FIG. 7 is a picture screen display related to fine area corrections.

A selective color correction of color areas can be undertaken by calling in the program "fine-area correction." The flow chart for a selected color correction or for a fine-area correction may be seen in FIGS. 6a, 6b and 6c. With the call-in of the program (S1), a dialogue window 31 is first displayed on the monitor 4, as may be seen in FIG. 7. By clicking into the input field "reset" 33 (S2) with the mouse 5, the color sample memory 14 is erased (S3) and the message width for color samples in the color space is set to the amount "2" (S4). As a result thereof, only the points that have the same classification are selected in the CIELAB color space. Subsequent settings for the message width are possible; they refer to the colors in the CIELAB color space:

0=select individual dot

1=selected dot plus the dot lying thereabove and therebelow in luminance

2=selected dot plus all immediately neighboring dots

3=selected dot plus the dots spherically located therearound—the radius of the sphere is thereby equal to 2

4=selected dot plus the dots spherically located therearound—the radius of the sphere is thereby equal to 3 etc., until 15=selected dot as well as the dots spherically located therearound—the radius of this sphere is thereby equal to 14.

These values can be input into the input field "message width" 37 by the operator with the keyboard 3. The standard value of "2" is set for the fine-area correction as long as the operator does not input a different value.

The color sample memory is erased by the step "reset"; no undesired color samples are thus located in the color sample memory. As the next step (S5), the operator of the system collects new color samples from the color image to be corrected, this being displayed on the monitor 4. For that purpose, the cursor is moved with the coordinate input means, for example a mouse in this case, into an area of the image whose color is to be modified. Thus, for example, a skin color or an especially pale color can be provided in the image. After the cursor has been placed on the desired color pixel, a sample with the corresponding color is taken from the image (S6) by clicking with the left-hand mouse key, and the corresponding L*a*b* color values address the memory cell corresponding thereto in the color sample memory 14, this cell now being set ("1"=sample taken). In order to avoid errors in the selection of the color pixels, pixels in the proximity of the pixel that has been clicked can also be taken and deposited in the color sample memory 14. For example, pixels that lie within a 3×3 matrix around the selected pixel in the image can also be considered. For that purpose, an arithmetic average of the color data of the color samples is formed. The step of taking color samples can now be repeated a few times (S5 through S8) until an adequate plurality of color samples of the color has been selected. Thus, the color sample memory 14 also accepts dark and bright areas of the color, or of the transitions of the color, in the area to another color into the color sample memory.

Figure 8:
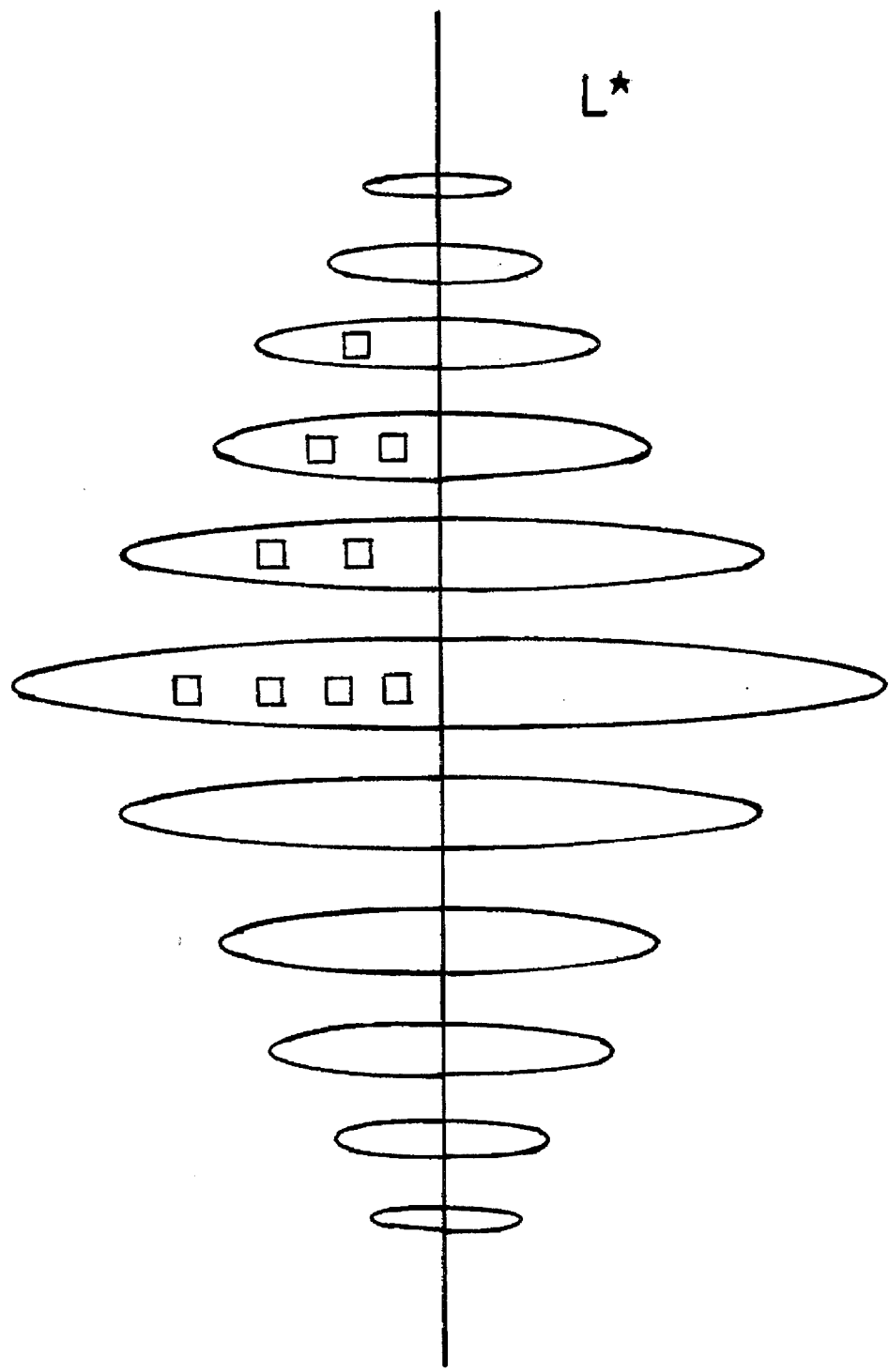
FIG. 8 shows collected color samples in the L* plane.

The color coordinates of the selected color samples in the CIELAB color space are displayed (S7)in the dialogue window (FIG. 7) on the luminance axis L* (FIG. 8) and in the color selection or a*b* plane. In the left-hand color selection 38, the LAB color space is displayed as viewed from above, i.e. all samples 43 are displayed independently of their L* value. In the right-hand color selection 39, only the color samples in the current L* plane are displayed that were set by the marking 41. The axis 40 in the middle references the L* axis. By shifting the slide 42, a current luminance plane can be selected; and the operator can view the a*b* values on the right-hand color selection 39. FIG. 8 shows various luminance steps in a color space shown in simplified fashion, the color samples having been taken therein.

When the operator is not satisfied with the current color sample selection, color samples can also be subsequently collected (S8); the program then again branches to the point "collect samples" (S5). Samples can also be directly set in the color selection in that the operator clicks with the mouse 5 onto the corresponding location in the color selection 38 or color selection 39.

The collected color samples can now also be subsequently manipulated by the program steps (S9, S10) of "fill gaps", (S11, S12) "cancel individual dots", and (S13, S14) "smooth selection." The description of the recited functions shall occur later.

After the steps (S9–S14) have been run through, the color sample display is updated (S15) and the current color samples are displayed. When the operator is still not satisfied (S16) with the color sample selection, the preceding steps (S5–S15) can be repeated. Given a satisfactory selection, what now occurs as a next step is the input of color correction values (S17). The input (S18) occurs as a delta value into the input fields 44, 45, 46. The values by which the selected color area are to be corrected are input here, i.e. by which a shift in color space should be carried out. The middle points of the area are then varied by the values that have been set. In order to assure harmonic color transitions, the correction decreases in the direction toward the outer dots in the color sample space. The input of the color correction values preferably occurs in the LCH color system which is equivalent to the CIELAB system. The realized user surface LCH creates the setting values for the luminance (L), chromaticity (chroma) and for the hue (H) from the CIELAB color space. (Luminance L=L, chrominance C=$\sqrt{a^{*2}+b^{*2}}$, hue H=arctan(b*/a*).) The colors can thus be corrected according to luminance, chromaticity and hue in conformity with sensation. The value range for the luminance L extends from 0 for absolute black up to 100 for reference white. All gray scale tones free of chromaticity are located between 0 and 100. Setting possibilities from 0 through 100 also expediently form the basis for the chromaticity. The position of the hue is defined in degrees in the color circle. Settings from 0 through 360 are correspondingly possible for the hue H. The color sample display is updated (S19) in accordance with the input color correction values and now displays the color space of shifted color samples. The original color image and the corrected color image can now be displayed side-by-side on the monitor 4 with and without the dialogue window 31, or only the corrected color image is displayed dependent on the operators' option. When the fine-area correction is not satisfactory, the preceding program steps can be repeated (S20). When the fine-area correction is satisfactory, the image is stored (S21) in the memory 16, on the hard disk 18, or on the floppy 19 and the program part is ended (S22).

The color samples taken from the image now form an irregular collection of dots, what is referred to as a "cloud" in the CIELAB color space. Dependent on how many different colors have been taken from the image, a plurality of clouds may also have arisen. As a rule, however, the individual clouds have unoccupied locations in the color space or color sample memory. Moreover, potentially singular points in the color space may be occupied. When a color correction is now calculated with this cloud, then one does not obtain a harmonic behavior of the color correction; for example, discontinuities in the colors can occur. A filling of the undesired gaps can be achieved by an add-on operator. Moreover, it is also possible to enlarge the clouds given an appropriate selection of a threshold. Analogously, a removal of the undesired, singular dots, or making the cloud smaller, can also be realized with a take-away operator. In order to achieve these operations, the weighted sum of each dot and of its proximity is calculated as in a three-dimensional, digital filtering. (See Anil K. Jain "Fundamentals of Digital Image Processing", Prentice Hall International Editions 1989, pages 244–245, here expanded onto three dimensions):

P(x,y,z) value of the dot at the locations x, y, z; 0 or 1

W a suitable window having the dimensions (2l+1), (2m+1), (2n+1)

a(i,j,k) equals weighting matrix.

A sum S is formed that is compared to a threshold T.

$$S(x,y,z) = \sum_i \sum_j \sum_k a(i,j,k)P(x+i, y+j, z+k)$$

with $-l<=i<=+l$ $-m<=j<=+m$ $-n<=k<=+n$

Figure 9A:
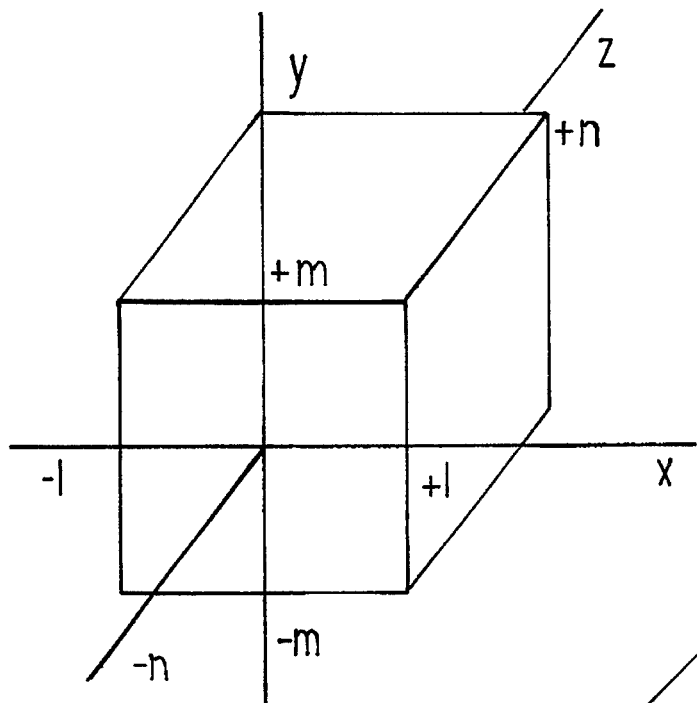
FIG. 9a is an example for a window employed in the invention.
Figure 9B:
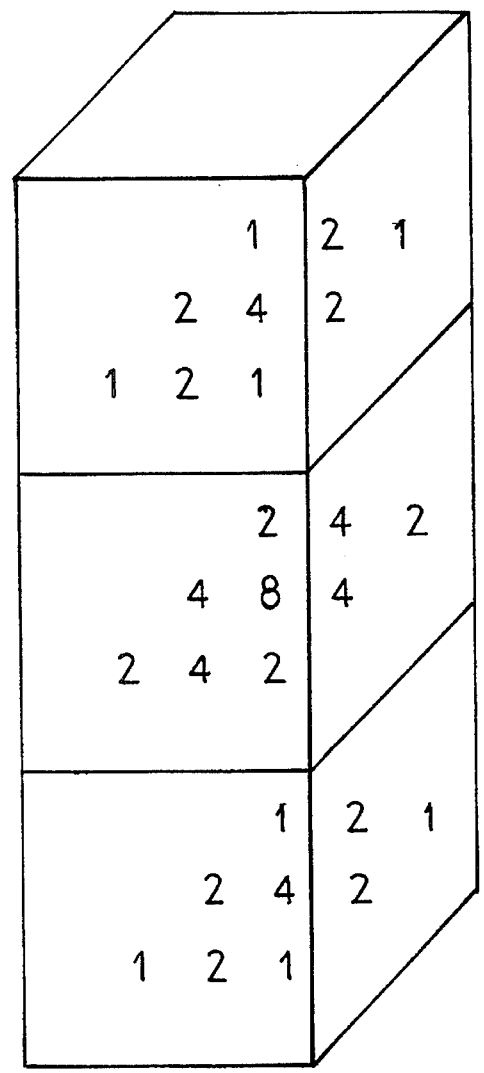
FIG. 9b is an example for a weighting matrix.
Figures 10A, 10B:
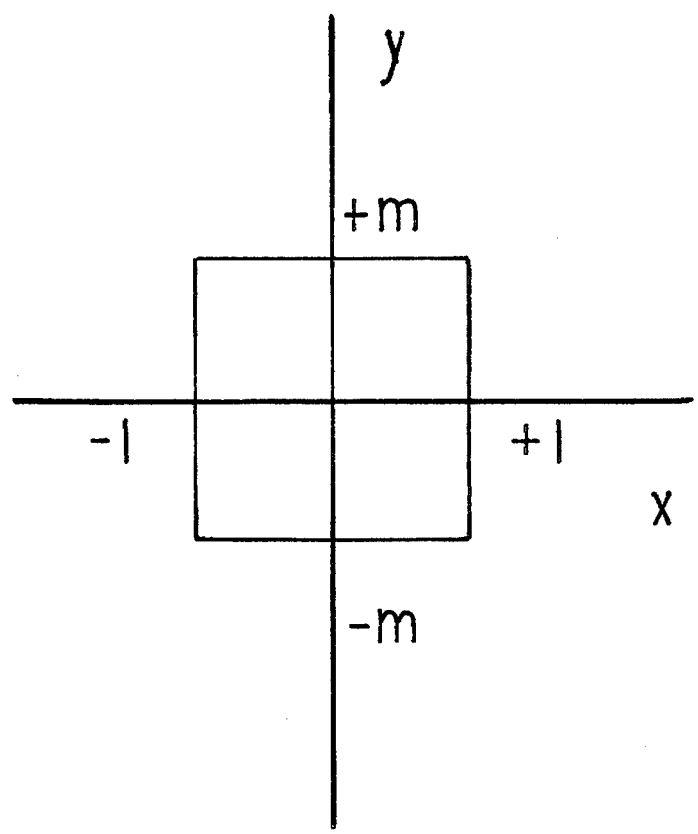
FIG. 10a is an example of a two-dimensional filter window of the filter function "fill gaps"
FIG. 10b is an employed weighting matrix.
Figure 10C:
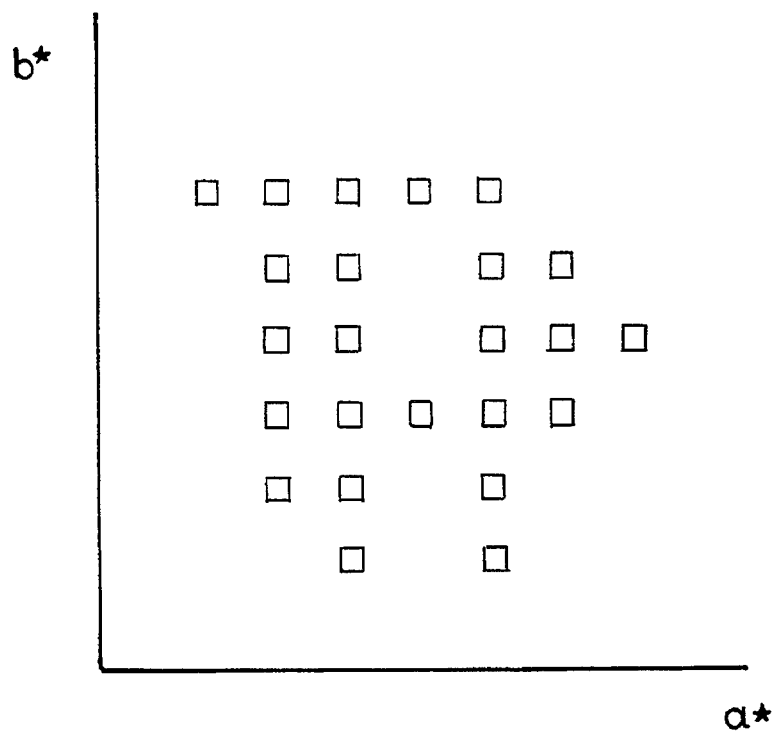
FIG. 10c shows collected color samples.
Figure 10D:
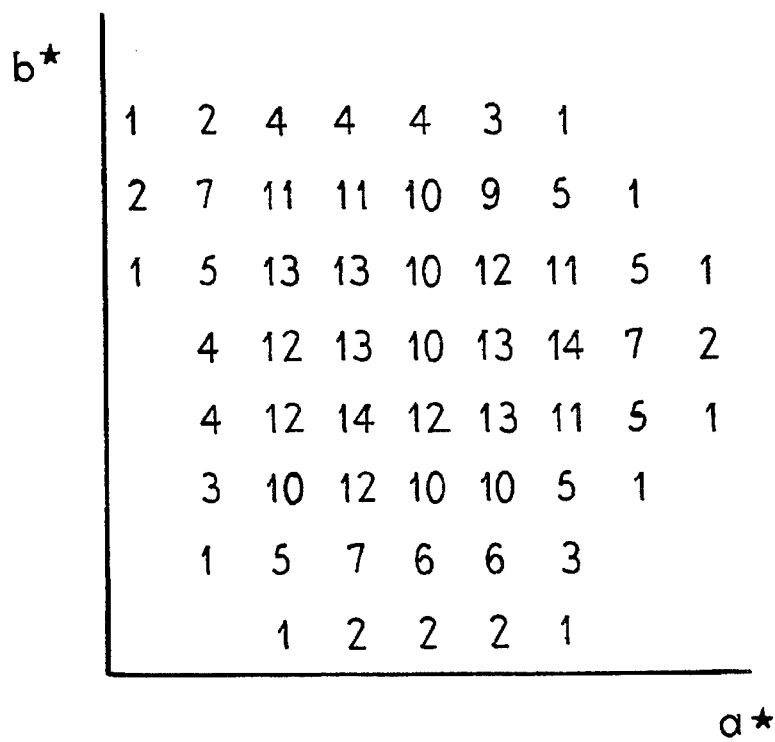
FIG. 10d illustrates the weighted sum.
Figure 10E:
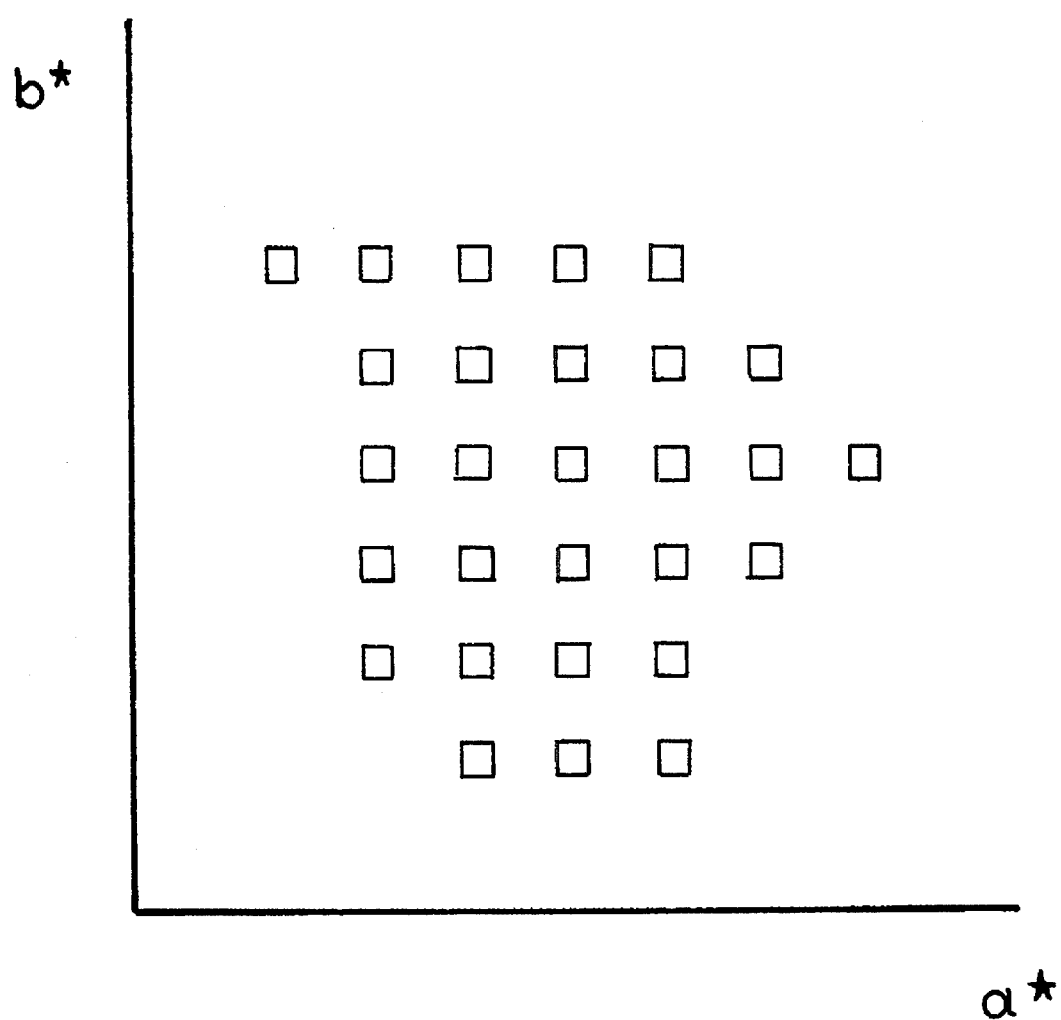
FIG. 10e shows the result of the filtering.
Figures 11A, 11B:
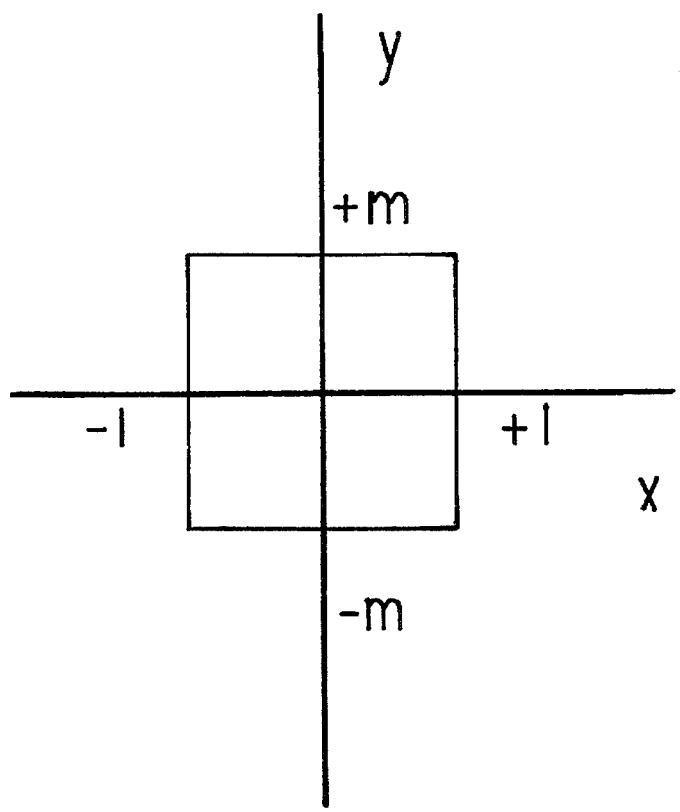
FIG. 11a is an example of a filter window of the filter function "cancel individual points"
FIG. 11b is an example of an employed weighting matrix.
Figure 11C:
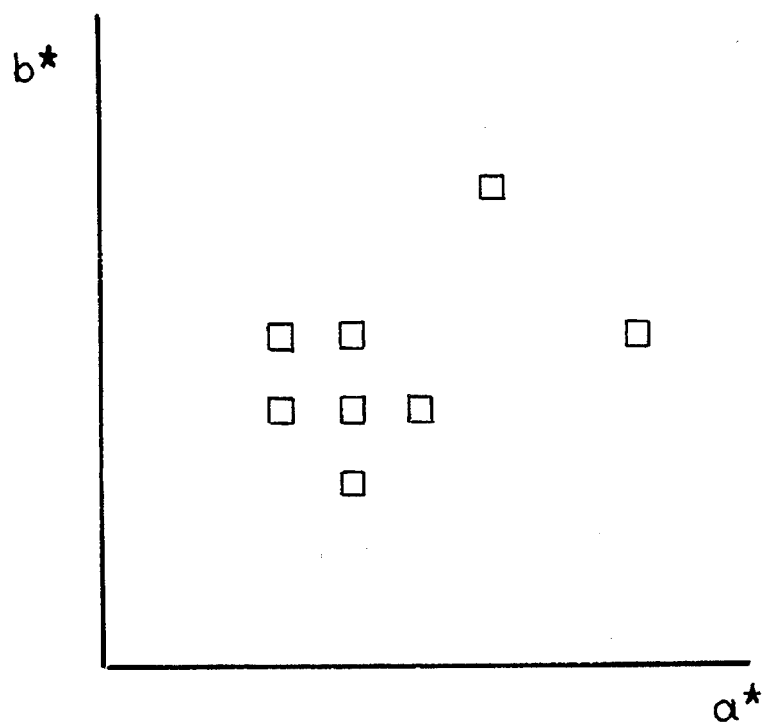
FIG. 11c shows collected color samples with a cloud and individual points.
Figure 11D:
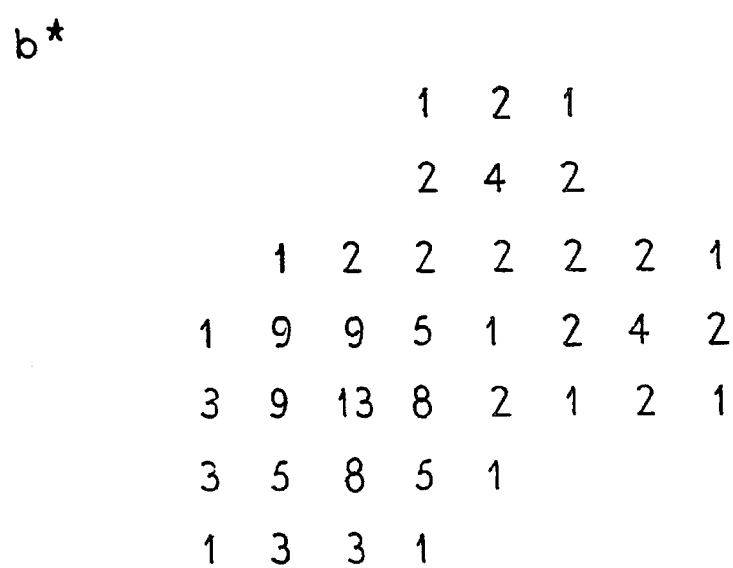
FIG. 11d shows the weighted sum.
Figure 11E:
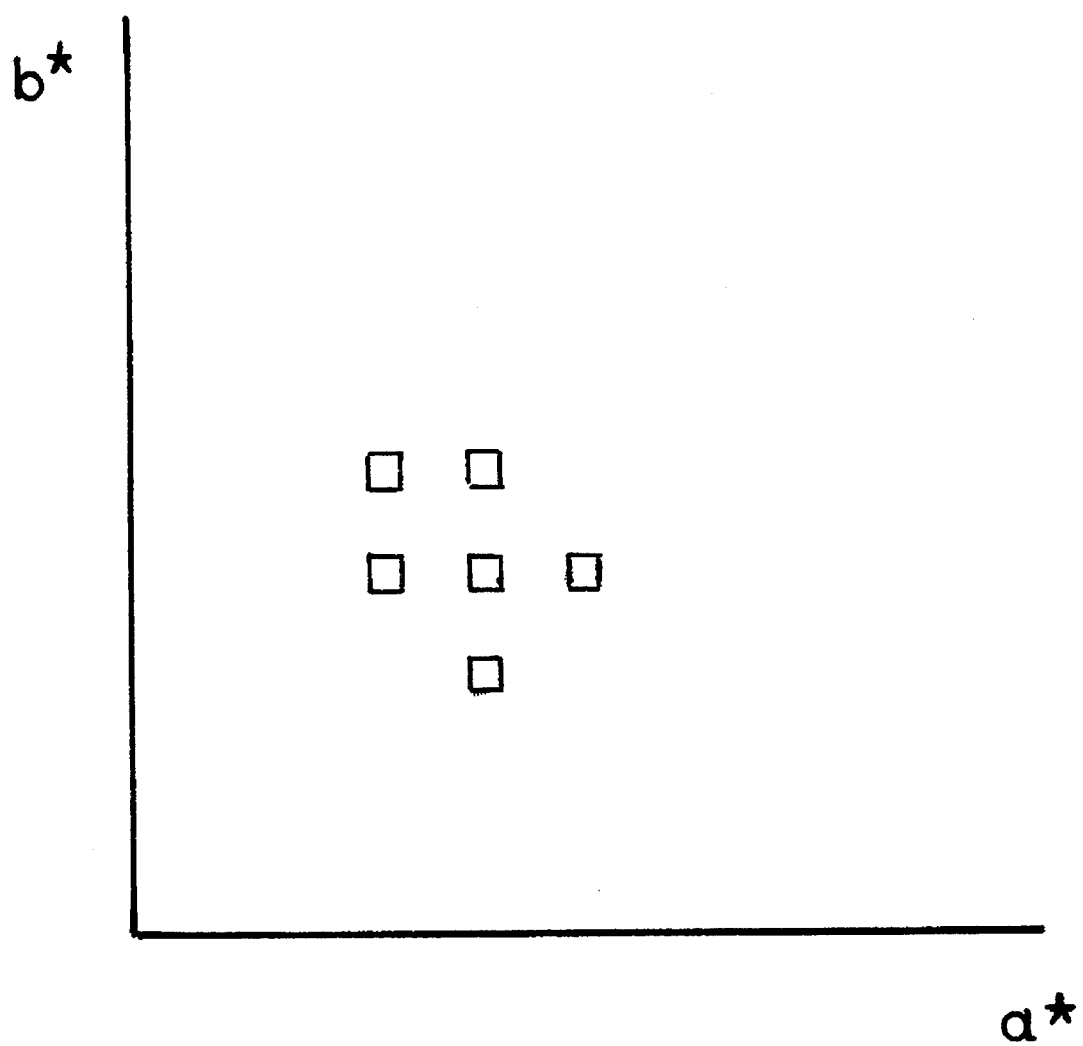
FIG. 11e illustrates the result of the filtering.

FIG. 9 indicates an example of a filter window W and of a weighting matrix a(i, j, k).

The filter window here has the dimensions 3×3×3, i.e. l=m=n=1, the i, j, k correspondingly running from −1, 0 to +1.

This sum S is then compared to the threshold of the add-on operator. When the sum is larger, then the dot is set.

Analogously thereto, the take-away operator works for sums that are smaller than the corresponding take-away threshold. When the sum is smaller than the take-away threshold, the dot is cancelled.

Upon call-in of the function "fill gaps" in the program for fine-area correction, the following function is now executed, an example thereof being recited in FIG. 10. The following equations then derive since the data are processed in the CIELAB color space in the preferred embodiment of the invention:

P(L*, a*, b*) color sample at the location L*, a*, b* in the color space or color sample memory, amount to 0 or 1.

a(i,j,k) suitable weighting matrix for weighting the color samples

W a suitable window having the three dimensions (2l+1), (2m+1), (2n+1)

deriving for the sum S(L*,a*,b*) for a point at the location L*a*b* in the color space $$S(L^*,a^*,b^*) = \sum_i \sum_j \sum_k a(i,j,k)P(L^*+i, a^*+j, b^*+k)$$

with the values for i,j,k being defined by the size of the filter window $-l<=i<=+l$ $-m<=j<=+m$ $-n<=k<=+n$ Given the function "fill gaps", gaps are filled in the color space. The sums (S(L*,a*,b*)) that derive for various points L*a*b* in the color space are compared to a threshold Tλ in the function "fill gaps." When the sum S(L*,a*,b*) is greater than the threshold Tλ, then the corresponding dot P(L*,a*, b*) is set in the color space or in the color sample memory, i.e. a gap has been filled.

Given the function "cancel individual dots", individual dots in the color sample memory are cancelled. The sum S(L*,a*,b*) is compared to a threshold Tε of the function "cancel individual dots." When S(L*,a*,b*) is smaller than the threshold Tε, the corresponding dot is cancelled.

FIG. 10 shows an example of the add-on operation "fill gaps." For the sake of simplicity, the example was limited to two dimensions a*,b* having a fixed value for L*. FIG. 10b shows a weighting matrix a(i,j) employed. The filter window W employed (FIG. 10a) has the dimensions 3×3. FIG. 10c shows an excerpt from the color sample memory in the a*b* plane. Gaps have arisen here when collecting the color samples. The color at the location of the gaps is not taken into consideration in a color correction. FIG. 10c shows the resulting sum S(a*,b*). FIG. 10d shows the result after the sum S(a*,b*) has been compared to the threshold Tλ. All dots are set where the sum is greater than the threshold Tλ. The gaps are filled. The threshold Tλ was empirically calculated and set at Tλ=6 here. By a repeated call-in of the function "fill gaps", the color sample space can be correspondingly enlarged.

Analogously thereto, FIG. 11 shows a two-dimensional example of the take-away operation "cancel individual dots." The filter window W (FIG. 11a) has the dimensions 3×3. FIG. 11b shows a weighting matrix a(i,j) employed. FIG. 11c shows an excerpt from the color sample memory in the a*b* plane. Singular points were also co-incorporated here into the selection which could later lead to an undesired color correction. FIG. 11b shows the resulting sum S(a*,b*). FIG. 11e shows the result after the sum S(a*b*) was compared to the take-away threshold Tε of the function "cancel individual dots." The individual dots were cancelled, whereas the cloud was preserved. Only those colors that also in fact belong to the selected color are thus utilized for the selective color correction.

Dependent on the selection of the thresholds for the add-on operation "fill gaps" and the take-away operation "cancel individual dots", different effects result in the filtering of the color samples. Upon start-up of the system, standard values are set for the thresholds. These, however, can also be modified by the operator by call-in of a menu in the user surface. This, for example, can occur in a special service mode in which other system parameters can also be modified.

The function "SMOOTH SELECTION" is a combination of the functions "fill gaps" and "cancel individual dots." The corresponding dot is set in the color sample memory when it is greater than the threshold, and is cancelled when it is less than the threshold. For that purpose, the sum S(L*,a*, b*) is successively compared to the add-on threshold Tλs and to the take-away thresholds Tεs of the function "SMOOTH SELECTION."

Instead of two different thresholds, it is also conceivable to employ only one threshold for the two functions "fill gaps" and "cancel individual dots."

The color sample selection is made correspondingly smaller by the function "Shrink Selection." For that purpose, the sum S(L*,a*,b*) is compared to the threshold σ of the function "Shrink Selection." When the sum is smaller than the threshold, the corresponding dot in the color specimen memory is cancelled.

Closed color sub-spaces or color sample spaces that are employed for the color correction have arisen in the color space due to the filtering of the clouds. The color sample spaces thereby define the area of the colors that were shifted in the color space corresponding to the values input in step (S18) of the fine-area program. In the corresponding filling, the XLUT 27 is loaded with values modified in accordance with the color correction values at the locations identified by the color sample spaces. For that purpose, the corresponding locations in the color sample memory 14 at which a color sample was set are converted into addresses for the XLUT 27, and the corresponding value is then written at the address location in the XLUT 27 via the data bus 29 A color correction for the image deposited in the store 16 can now be calculated with the modified values in the XLUT 27. For that purpose, the image data are applied via the NU bus 22 to the color computer 6. The color-corrected value then appears at the output of the color computer, which can in turn be deposited in the store 16. The operator can view the color-corrected image on the monitor 4.

OTHER EMBODIMENTS

The above invention was described in the preferred embodiment thereof on the basis of employing CIELAB color coordinates and on the basis of add-on and take-away operations. In another embodiment of the invention, a CMYK color coordinate system is employed instead of a CIELAB color coordinate system. The color correction values are then correspondingly input as CMYK values. Of course, the employment of other color systems such as, for example, RGB, XYZ is also possible. The filtering in the preferred embodiment of the invention was described here on the basis of a weighted sum that was compared to a threshold. The employment of other filter functions, of course, is possible.

The color sample memory stores the color samples in a full resolution of the 3×8 bits for the L*,a*,b* values. As a result thereof, the color sample memory becomes correspondingly large. In order to reduce the memory capacity, the color samples can also be deposited in a memory having a reduced resolution for the color coordinates. In a way similar to that set forth for the color correction, the intermediate values can then be interpolated.

Other embodiments and modifications deriving for a person skilled in the art from the prior art and from the invention have not been described here but fall within the scope of the invention.

Although various minor changes and modifications might be suggested by those skilled in this art, it will be understood that we wish to include within the scope of the patent warranted hereon all such changes and modifications as reasonably come within our contribution to the art.

We claim as our invention:

1. A method for color correction of a color image, comprising the steps of:

storing a color image or a corrected color image in an image store;

displaying the stored color image, the corrected color image, or other image data on a monitor;

indicating image coordinates on the monitor with a coordinate input unit;

storing color samples in a color sample memory;

correcting color values of the stored color image with a color computer;

collecting color samples from the color image with the coordinate input unit, the collected color samples forming a color sample space later employed for selective color correction;

storing color values of the collected color samples in the color sample memory;

subjecting the collected color samples to a filtering;

displaying on the monitor the collected color samples in a color space having a color coordinate system;

inputting color correction values which modify colors defined by the color sample space;

with the color computer, using the color sample space that has been produced and the color correction values for selective color correction of the color image; and storing a resulting corrected color image in the image store.

2. A method according to claim 1 wherein a collecting width for the color samples and the color space is freely selectable.

3. A method according to claim 2 wherein the collecting width for the color samples is 1 in each dimension.

4. A method according to claim 1 wherein said filtering comprises subjecting the color samples to a three-dimensional filtering in the color space.

5. A method according to claim 4 wherein the filtering occurs in a L*a*b* color space and the filtering is established by the function $$S(L^*,a^*,b^*) = \sum_i \sum_j \sum_k a(i,j,k) P(L^* + i, a^* + j, b^* + k)$$

whereby a(i,j,k) is a weighting matrix
and the sum S(L*,a*,b) is compared to thresholds.

6. A method according to claim 5 including the step of filling gaps in the color sample space by said filtering.

7. A method according to claim 5 including the step of cancelling individual dots in the color sample space by said filtering.

8. A method according to claim 5 including the step of filling gaps in the color sample space and cancelling individual dots in the color sample space by said filtering.

9. A method according to claim 1 including the step of subjecting the color samples to a four-dimension filtering in a CMYK color space.

10. A method according to claim 1 including the step of providing the color correction values as L*a*b* values and adding them to or subtracting them from the color values of the color samples.

11. A method according to claim 1 including the step of providing the color correction values as LCH values and adding them or subtracting them from the original color values.

12. A method according to claim 1 including the step of displaying data of image coordinates of the color samples in a window on the monitor in addition to the color image or corrected color image.

13. A method according to claim 1 including the step of processing the color values in a L*a*b* color space.

14. A method according to claim 1 including the step of establishing said color values in a television standard.

15. A method according to claim 14 wherein the television standard is one of the standards selected from the group NTSC, PAL, and SECAM.

16. A method according to claim 1 including the step of processing said color values in a CMYK color system.

17. A method according to claim 1 including the step of collecting said color samples in a color sample space having a reduced resolution.

18. A method according to claim 1 including the step of providing said coordinate input unit as a mouse.

19. A method according to claim 1 including the step of providing said coordinate input unit as an xy tablet.

20. A method for color correction of a color image, comprising the steps of:

storing a color image in an image store;

displaying the stored color image on a monitor;

storing color samples in a color sample memory;

correcting color values of the stored color image with a color computer;

collecting color samples from the color image with a coordinate input unit, the collected color samples forming a color sample space;

storing the collected color samples in the color sample memory;

subjecting the collected color samples to a filtering to avoid discontinuities;

displaying on the monitor the collected color samples in a color space having a color coordinate system;

inputting color correction values which modify colors defined by the color sample space; and with the color computer, using the color sample space that has been produced and the color correction values for selective color correction of the color image.

* * * * *